US010379234B2

(12) United States Patent
Wei et al.

(10) Patent No.: US 10,379,234 B2
(45) Date of Patent: Aug. 13, 2019

(54) PORTABLE REAL TIME IN-SITU GAMMA-RAY ANALYSIS SYSTEM

(71) Applicants: The United States of America, as represented by the Secretary, Department of Health and Human Services, Bethesda, MD (US); Mirion Technologies, Inc., Meriden, CT (US); Mirion Technologies (Canberra UK) Limited, Didcot, Oxfordshire (GB)

(72) Inventors: Cong Wei, Rockville, MD (US); Kelly M. Garnick, Rockville, MD (US); Thomas A. Scott, Rockville, MD (US); Elon M. Malkin, Rockville, MD (US); Jennifer T. Szymanski, Rockville, MD (US); Steve Laskos, Meriden, CT (US); James Cocks, Meriden, CT (US); Jeffrey Raimondi, Meriden, CT (US); Richard Mowry, Meriden, CT (US); Hiram Gonzalez, Meriden, CT (US); Ronald White, Meriden, CT (US); Wilhelm Mueller, Meriden, CT (US); Robert Fournier, Meriden, CT (US)

(73) Assignees: THE UNITED STATES OF AMERICA, as represented by the Secretary, Department of Health and Human Services, Silver Spring, MD (US); Mirion Technologies, Inc., Meriden, CT (US); Mirion Technologies (Canberra UK) Limited, Oxfordshire (GB)

( * ) Notice: Subject to any disclaimer, the term of this patent is extended or adjusted under 35 U.S.C. 154(b) by 0 days.

(21) Appl. No.: 15/756,667

(22) PCT Filed: Sep. 8, 2016

(86) PCT No.: PCT/US2016/050661
§ 371 (c)(1),
(2) Date: Mar. 1, 2018

(87) PCT Pub. No.: WO2017/044555
PCT Pub. Date: Mar. 16, 2017

(65) Prior Publication Data
US 2018/0246232 A1    Aug. 30, 2018

Related U.S. Application Data

(60) Provisional application No. 62/215,609, filed on Sep. 8, 2015.

(51) Int. Cl.
*G01T 7/02* (2006.01)
*G01T 7/00* (2006.01)
*G01T 1/167* (2006.01)

(52) U.S. Cl.
CPC ............... *G01T 7/02* (2013.01); *G01T 1/167* (2013.01); *G01T 7/00* (2013.01)

(58) Field of Classification Search
CPC ................................. G01T 1/167; G01T 7/02
See application file for complete search history.

(56) References Cited

U.S. PATENT DOCUMENTS

| | | | | |
|---|---|---|---|---|
| 2003/0225531 | A1* | 12/2003 | Lingren | ............. G01N 23/2255 702/23 |
| 2012/0046867 | A1* | 2/2012 | Faber | .................... G01T 1/1611 702/8 |
| 2013/0191046 | A1 | 7/2013 | Henning et al. | |
| 2015/0108359 | A1* | 4/2015 | Panza | ..................... G01T 1/169 250/371 |
| 2015/0325320 | A1* | 11/2015 | Tran | ........................ G21F 5/005 588/4 |

FOREIGN PATENT DOCUMENTS

WO    WO 2013/052556    4/2013

OTHER PUBLICATIONS

International Search Report and Written Opinion for related International Application No. PCT/US2016/050661, dated Nov. 21, 2016, 11 pages.

(Continued)

*Primary Examiner* — Yara B Green
(74) *Attorney, Agent, or Firm* — Klarquist Sparkman, LLP

(57) ABSTRACT

A gamma-ray analysis system is described for analyzing gamma-ray emitting radionuclides. The gamma-ray analysis
(Continued)

system includes an analytical apparatus having a gamma-ray detector in operative communication with a modular and scalable shield assembly that encases a sample container having a sample to be tested. The detector communicates data to an electronic interface device that converts the data from an analog format to a digital format before a controller transmits the data to a central laboratory for further data processing, analysis and conclusion by qualified laboratory analysts. The controller runs an application software package on a graphic user interface that allows simple steps for conducting testing and data acquisition by the end user, while permitting real time data transmission between the field site and the central location. Functions were implemented for ensuring laboratory quality results while removing knowledge and experience requirements of an end user.

22 Claims, 10 Drawing Sheets

(56) References Cited

OTHER PUBLICATIONS

Model ISOXSHLD ISOCS™ Shield Systems Features, www.canberra.com/products/insitu_systems/pdf/ISOXShield-C40123.pdf, Jan. 1, 2013, 3 pages.
Model S573 ISOCS*™ Calibration Software, XP055318239, www.canberra.com/products/instiu_systems/pdf/ISOCS-SS-C40146.pdf, Jan. 1, 2013, 12 pages.
Examination Report for related European Application No. 16767117.1, dated Dec. 12, 2018, 6 pages.

* cited by examiner

Mashed Potato Matrix Count SPotMCs3B3

| Radionuclide | Spike # | Calculated Activity Cs-134 (Bq/kg) | MDA Cs-134 (Bq/kg) | MP Eff Activity Cs-134 (Bq/kg) | Calculated Activity Cs-137 (Bq/kg) | MDA Cs-137 (Bq/kg) | MP Eff Activity Cs-137 (Bq/kg) | MDA I-131 (Bq/kg) |
|---|---|---|---|---|---|---|---|---|
| Cs-134 | 3 | 592.85 | 36.50 | 582.45 | | | | |
| Cs-137 | 3 | | | | 617.96 | 39.15 | 583.48 | |
| I-131 | NA | | | | | | | 43.81 |

Fig. 10

PORTABLE REAL TIME IN-SITU GAMMA-RAY ANALYSIS SYSTEM

CROSS-REFERENCE TO RELATED APPLICATIONS

This is the U.S. National Stage of International Application No. PCT/US2016/050661, filed Sep. 8, 2016, which claims the benefit of U.S. Provisional Application No. 62/215,609, filed Sep. 8, 2015.

FIELD

The present disclosure is directed to systems and methods for gamma-ray analysis and more particularly to the field applications of a portable gamma-ray analytical apparatus for providing real-time in-situ gamma-ray analysis.

BACKGROUND

A radiological or a nuclear incident or accident could not only cause a catastrophic effect on public safety and health, but also have a devastating effect on a nation's economy and security. Efforts should be made for preparedness so that the adverse impact can be mitigated. During a radiological or nuclear emergency, a laboratory's capacity for analyzing a large number of samples and providing timely reliable laboratory analytical results are critical for consequence management decision making. The challenge for field examination in the subject area of radionuclide analysis is that in-depth expertise is required for performing analytical procedures, timely interpretation of data, and ensuring data quality; however, this type of in-depth expertise is only possessed by a limited number of radio-analytical personnel.

Prior art systems of identification for remote objects by detecting gamma-ray, X-ray and neutron radiations are known; however, none of these prior art systems provide any type of capability of identifying and quantifying gamma-ray emitting radionuclides with implementable and required features, such as predetermined thickness and material of the shield, taking into account the required detection limit and practical data acquisition time, necessary data quality objectives to meet the needs for regulatory, or emergency event consequence management decision making. Furthermore, none of the prior art systems provides realistic features to enable field portability and allow non-requirements of gamma-ray spectroscopy knowledge and experience of a field end user, while achieving the data quality objectives required for regulatory and emergency consequence management decision making.

BRIEF DESCRIPTION OF THE DRAWINGS

FIG. 10 is a report for the two cesium isotopes extrapolated from the spectral analysis of a sample.

Corresponding reference characters indicate corresponding elements among the view of the drawings. The headings used in the figures do not limit the scope of the claims.

DETAILED DESCRIPTION

Figure 1:
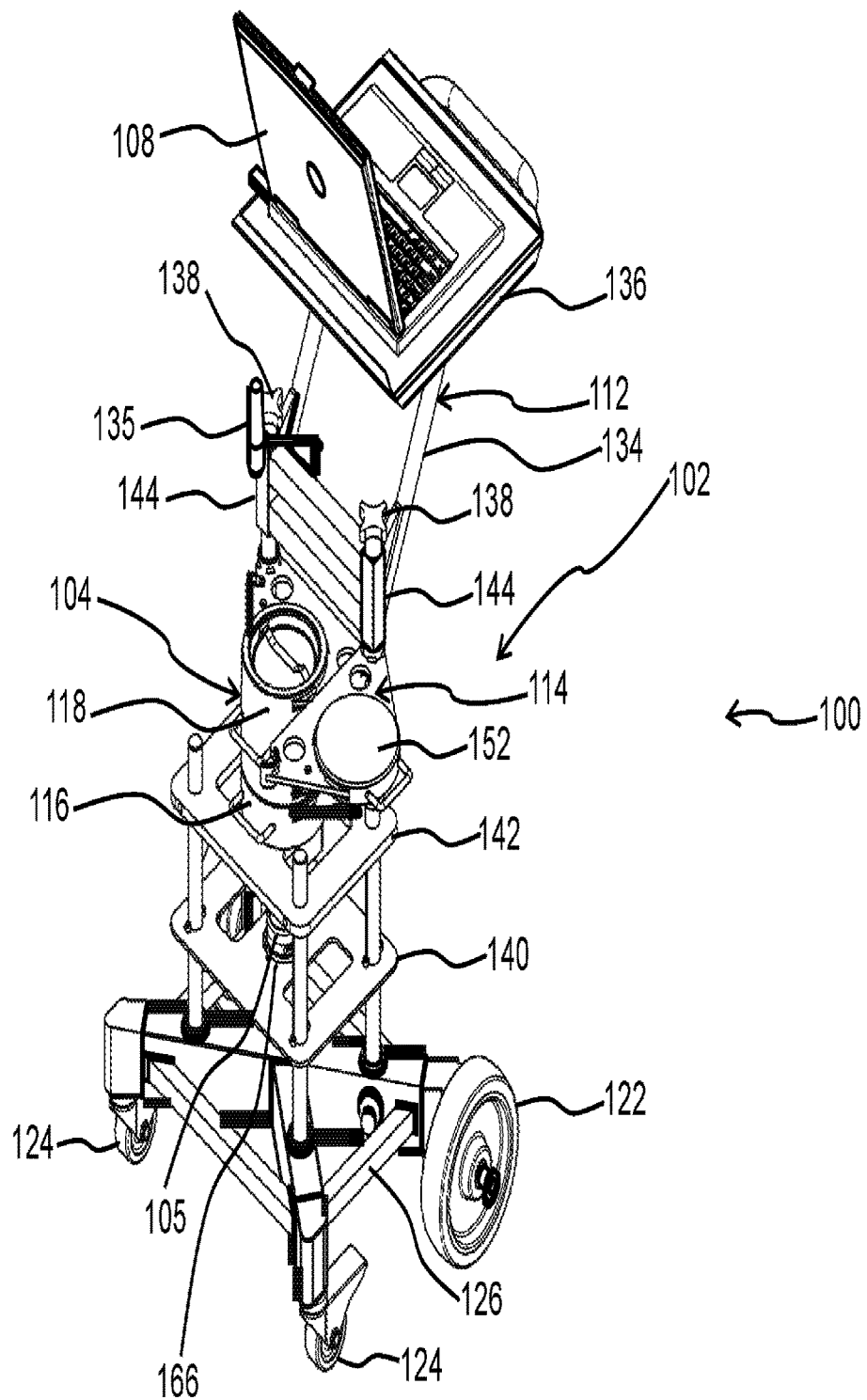
FIG. 1 is a perspective view of one embodiment of a portable analytical apparatus for a gamma-ray analysis system.

A field deployable gamma-ray analysis system with capability of identifying and quantifying radionuclides without the requirement of gamma-ray spectroscopy knowledge and experience of end users while being capable of achieving data quality objectives required for regulatory and emergency consequence management decision making is described herein. In particular, the field deployable gamma-ray analytical system includes a portable analytical apparatus having an electronic interface device used for converting detector data to gamma-ray spectrum and having a modular and scalable shield designed and built for meeting data quality objectives and realizing field portability. In addition, a server instrument controller at a central laboratory is in operative communication with a client instrument controller of the analytical apparatus. The analytical apparatus further includes an electronic interface that communicates with an application software package having user friendly graphic user interfaces (GUI) for allowing easy end-users' operations, for instance, a few entry and click operations for data collections and quality control operations. Software and hardware features of the portable gamma-ray analysis system allow real time data transmission from field to central location and field system trouble shooting from the server side. Referring to the drawings, embodiments of a gamma-ray analysis system are illustrated and generally indicated as 100 in FIGS. 1-10.

FIGS. 1-10 show one embodiment of the gamma-ray analysis system 100 having a portable analytical apparatus 102 that is operated at a field site to conduct real-time in-situ gamma-ray analysis of a sample. The analytical apparatus 102 includes a modular and scalable frame 106 engaged to a shield assembly 104 operable to receive a sample container 110 that houses a sample to be analyzed. The size of the top portion 114, the bottom portion 116 and middle portion 118 can be decreased or increased depending on the size of the sample container 110. The shielding assembly 104 can be made with more than one middle portion 118 to accommodate larger depth sample containers 110, thereby providing a shield assembly 104 that is scalable. The shield assembly 104 is in operative engagement with a detector arrangement 105 that is operable to detect any radiation, for example gamma-ray radiation, being emitted by the sample during detection and analysis by the gamma-ray analysis system 100.

Figure 5:
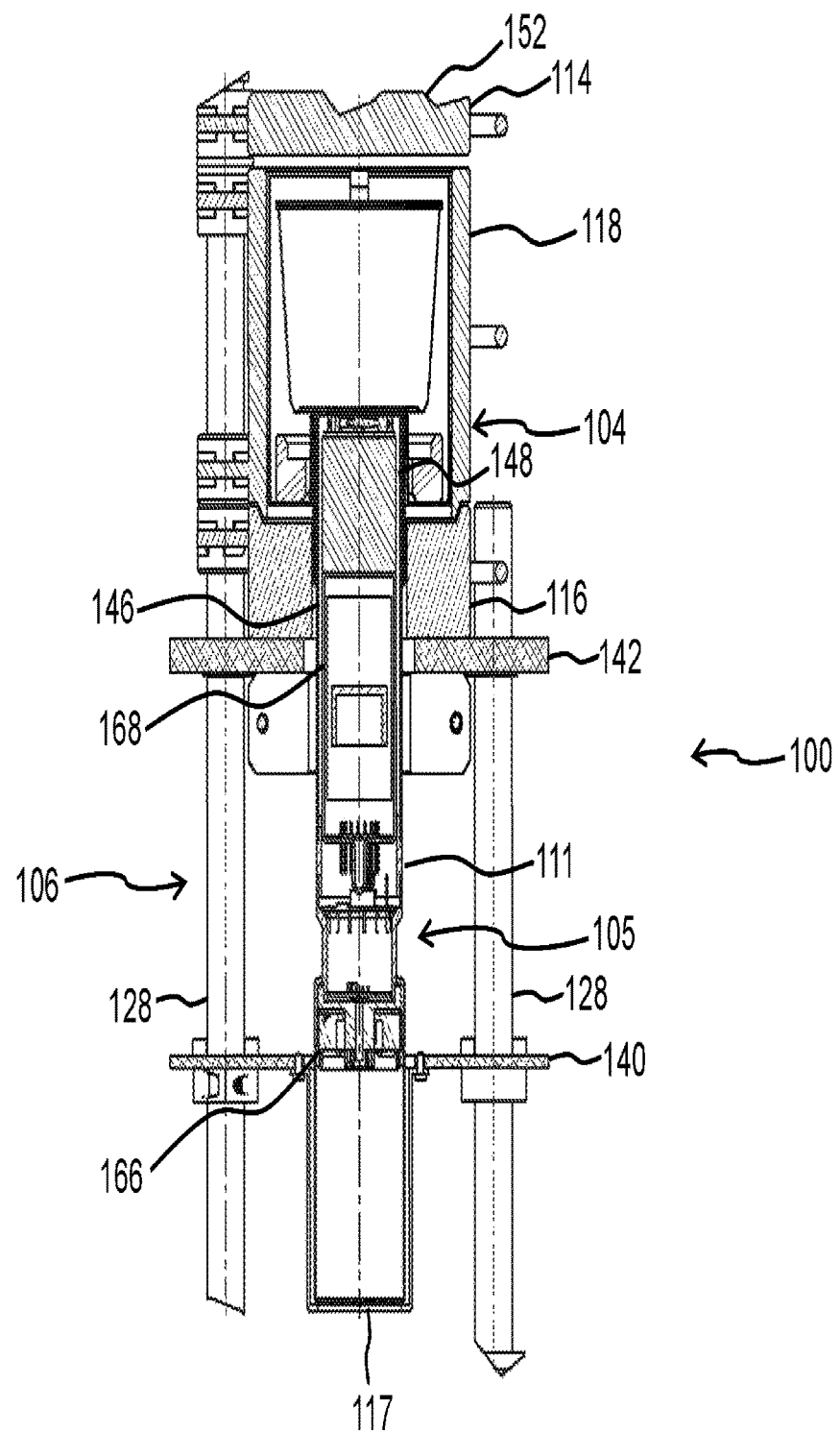
FIG. 5 is an enlarged cross-sectional view of the portable analytical apparatus showing the shield assembly and detector arrangement.
Figure 6:
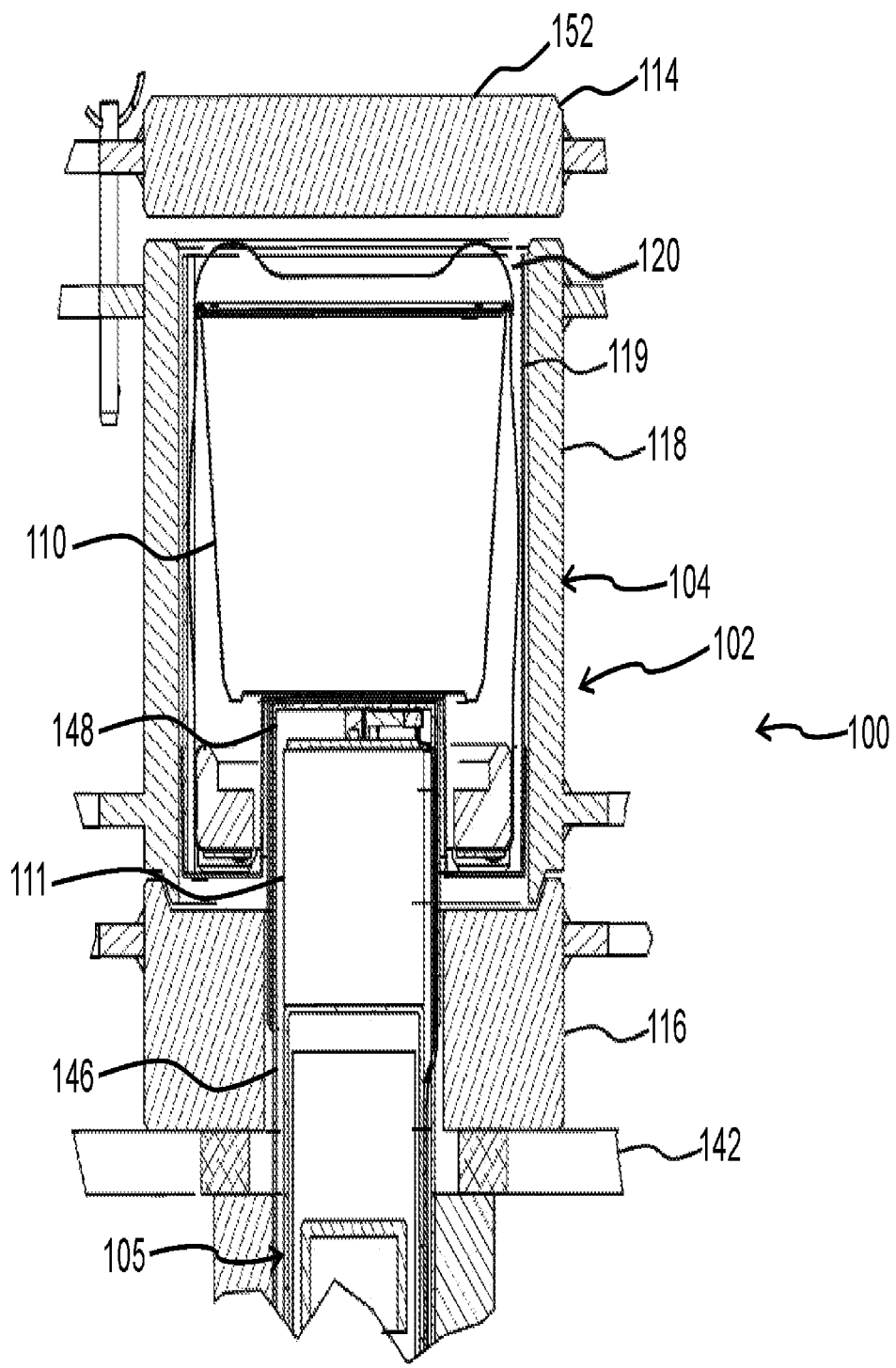
FIG. 6 is an enlarged view of the shield assembly and detector arrangement of FIG. 5.
Figure 7:
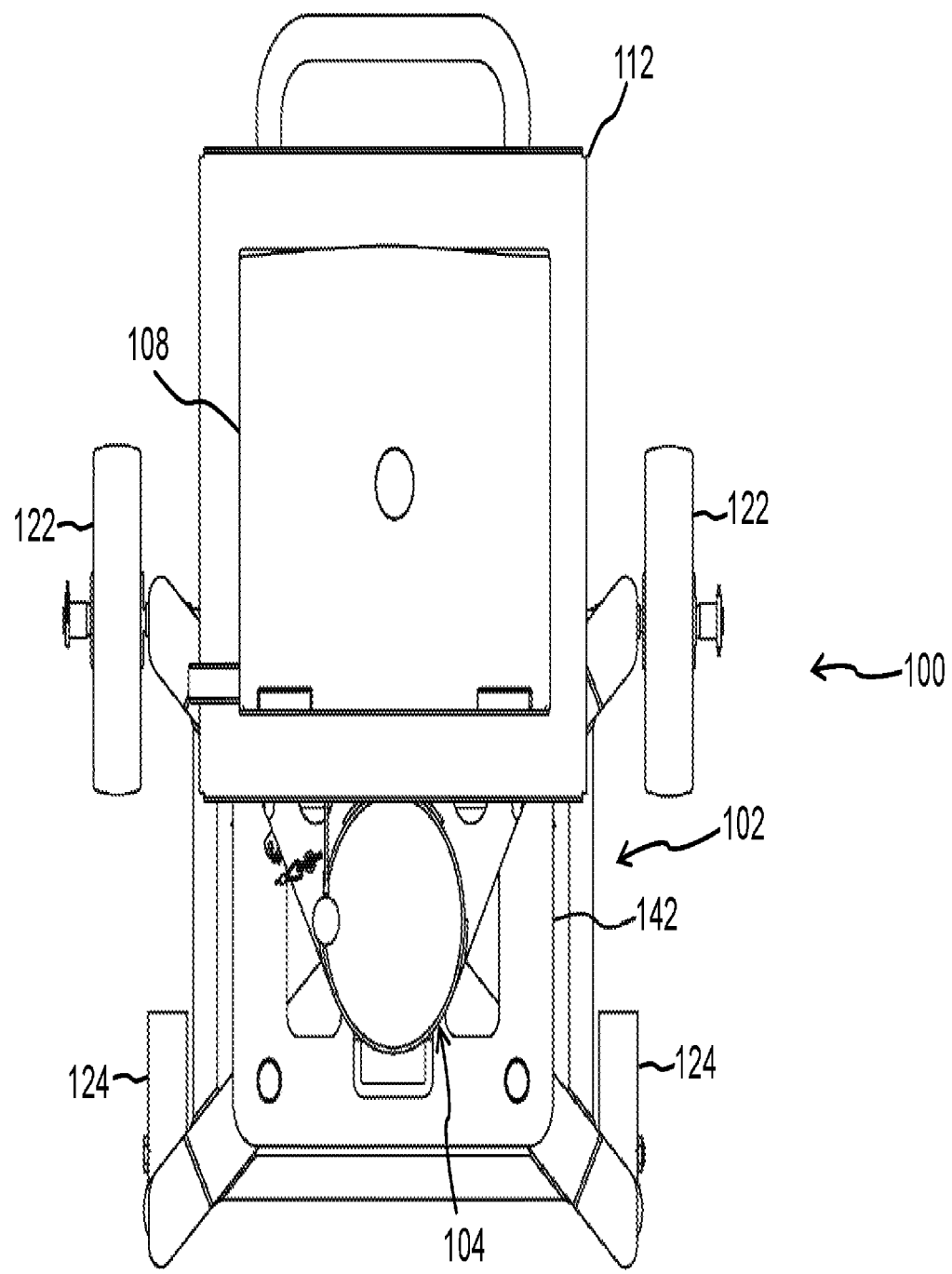
FIG. 7 is a top view of the portable analytical apparatus.

As shown in FIGS. 5 and 6, in some embodiments the shield assembly 104 includes a top portion 114, bottom portion 116 and middle portion 118 and is sized and shaped to shield the sample being tested from background interference from the outside environment. The top portion 114 of the shield assembly 104 includes a rotatable cover 152 for either opening or closing access to a chamber 120 defined by the middle portion 118 of the shield assembly 104. The chamber 120 is configured to receive therein the sample container 110 for positioning the sample in close proximity with the detector arrangement 105. The bottom portion 116 of the shield assembly 104 forms a central bore 146 that communicates with a central opening 148 formed through the middle portion 118 of the shield assembly 104 for insertion of the detector assembly 105 into chamber 120. Specifically, the central bore 146 is configured to receive a portion of the detector assembly 105 therein such that the detector assembly 105 communicates with the sample container 110 disposed within the chamber 120. The modular shield assembly 104 is also scalable. Namely, the number of components or the middle portion 118 varies depending on the volume needed for a sample container 110.

In some embodiments, the shield assembly 104 may be made of a material, such as stainless steel, that shields the sample from any background interference caused by environmental gamma-ray emissions, although other types of materials are contemplated that provide sufficient shielding from background interference from the outside environment. In some embodiments, the shielding assembly 104 may be made from other materials with similar or better shielding capability than that of stainless steel based on their physical properties such as density, mechanical strength, low level of radioisotope content, e.g., 3 Bq/kg etc. In some embodiments, the size of the shield assembly 104 depends on the size of the sample container 110, which is of a known volume. In some embodiments, the weight of the top, bottom, and middle portions 114, 116 and 118 of the shield assembly 104 is such that an average person is able to lift and handle the shield assembly 104 with ease. For example, in some embodiments the shield assembly 104 may weigh less than 20 lbs or 10 kgs.

FIG. 1 shows the rotatable cover 152 in the open position with the container 110 disposed within the chamber 120 of the shield assembly 104 and accessible for retrieval. FIGS. 5 and 6 both show the rotatable cover 152 in the closed position and the sample container 110 sealed within the chamber 120 such that a radiation detection operation may be performed on the sample by the analytical apparatus 102.

Referring back to FIG. 2, the sample container 110 may be configured to be disposed within a chamber 120. A sample handle 132 can be used for easily and quickly placing the sample container 110 within the chamber 120 and then removing the sample container 110 after counting during gamma-ray analysis. In addition, a removable protection piece 119 is configured to be disposed within the chamber 120 of the shield assembly 104 and in communication with the detection assembly 105 as illustrated in FIGS. 5 and 6.

Figure 2:
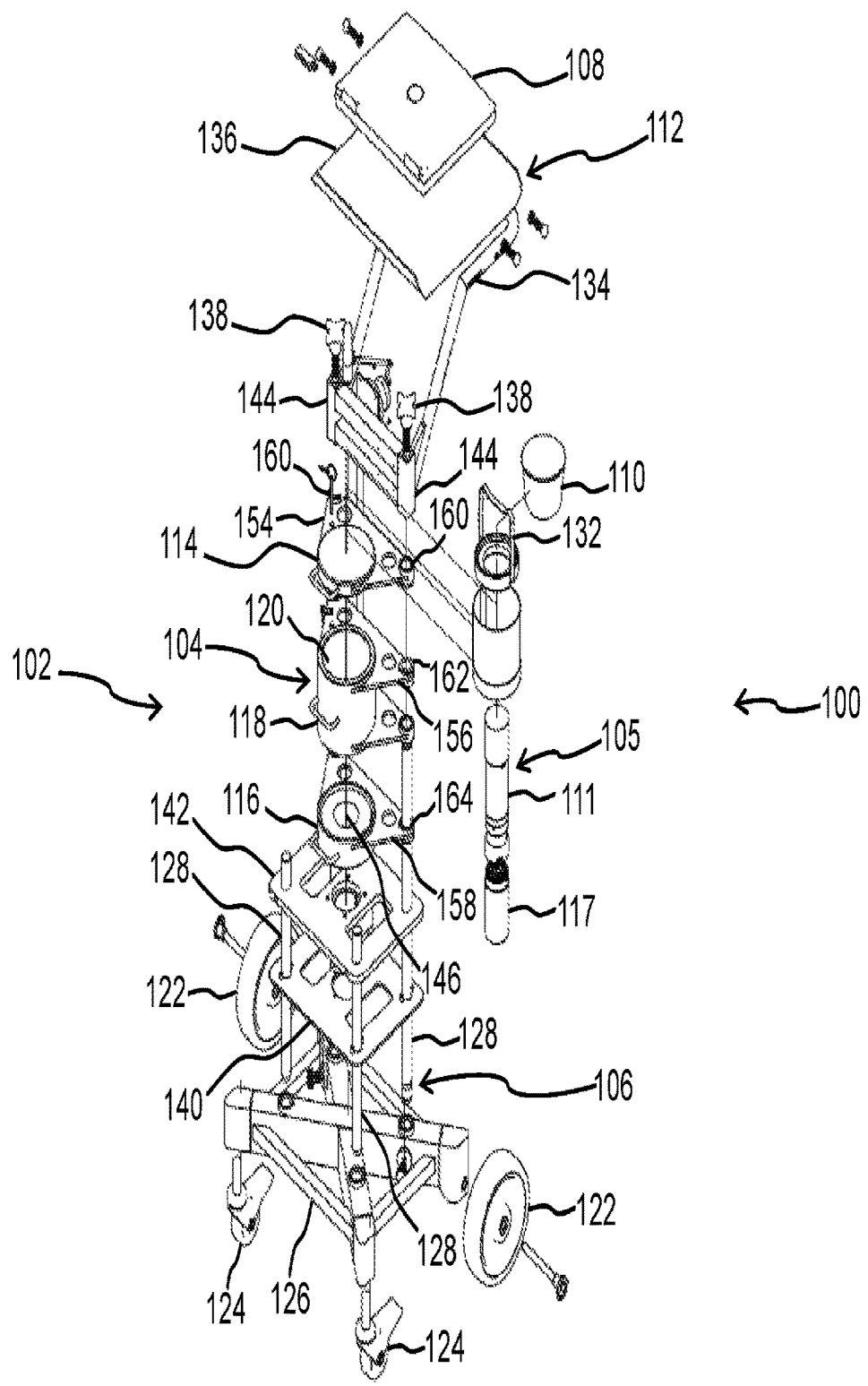
FIG. 2 is an exploded view of the portable analytical apparatus.

Referring to FIGS. 1-6, in some embodiments the frame 106 includes a base 126 coupled to a pair of wheels 122 and a pair of caster wheels 124 to allow the portable analytical apparatus 102 to be maneuvered in the field. The base 126 may be secured to rods 128, which are coupled to a first frame module 140 and a second frame module 142. The first frame module 140 and the second frame module 142 collectively provide a structural framework that couples the shield assembly 104 and detector assembly 105 to the modular frame 106. As illustrated in FIGS. 1 and 5, the first frame module 140 defines a first aperture 166 configured to receive a portion of the detection arrangement 105, while the second frame module 142 defines a second aperture 168 that is also configured to receive another portion of the detector arrangement 105. As shown in FIG. 2, the top portion 114, bottom portion 116 and middle portion 118 of the shield assembly 104 each include respective bodies 154, 156 and 158 having respective coupling mounts 160, 162 and 164 configured to be secured to respective rods 128 that collectively form a part of the modular frame 106.

Referring to FIGS. 1-4 and 7, the portable analytical apparatus 102 further includes a computer stand assembly 112 having a stand frame 134 with a stand 136 for providing a surface for placement of the controller 108, such as a laptop computer. The stand frame 134 further includes a pair of legs 144 coupled to coupling mounts 160 of the top portion 114 through a pair of adjustment knobs 138 that are tightened to secure respective legs 144 to the coupling mounts 160. In some embodiments, one of the coupling mounts 160 of the top portion 114 may rotate about one of the legs 144 to allow rotation of the rotatable cover 152 to open and close the shield assembly 104.

In some embodiments, the detector arrangement 105 includes a detector 111 for detecting gamma-ray radiation emitted from the sample within the sample container 110. The detector 111 is in operative communication with an electronic interface device 117 for use in receiving and processing gamma-ray data from the detector 111 and then converting the gamma-ray data from analog to digital format for further processing, interpretation and analytical conclusion using a gamma-ray spectroscopy software application executed on a processor operated on the field site controller 108 and central location controller (not shown) by a qualified laboratory analysts.

Figure 8:
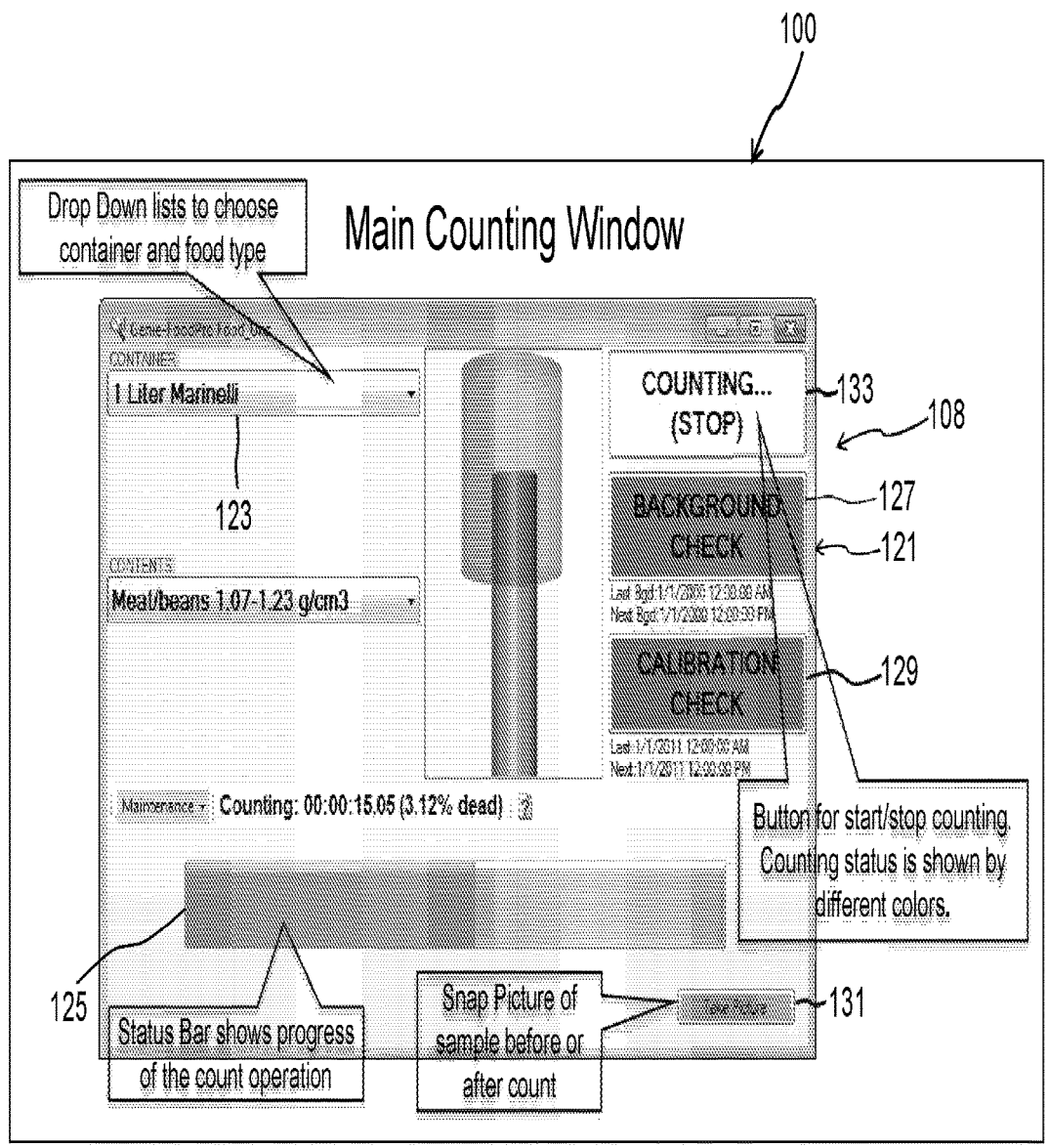
FIG. 8 is a screenshot of the application software run on the controller for operating the gamma-ray analysis system.

Referring to FIG. 8, in some embodiments the controller 108 may include input functionalities using a designed graphic user interface (GUI) 121 to enter end user's inputs into the controller 108. For example, the GUI 121 may include an entry location 123 so that the end user may select the type of container to be used during testing and the kind of sample to be tested, a gamma-ray counting bar 125 that provides a visual indication of the progress of the count operation, a background check button 127 for checking for any background radiation that might interfere with the testing procedure, a calibration check button 129 to calibrate the detector assembly 105 prior to initiating the counting operation, a camera actuation button 131 that instructs the camera 135 to snap a picture of the sample before and after the counting operation, an LCS button (not shown) or entry (not shown) for counting a laboratory control sample with a user defined sample batch and a counter control button 133 that initiates or terminates the counting operation by the portable analytical apparatus 102. Once the data has been collected, the controller 108 transmits counting and quality control data to a central analytical laboratory for analysis.

In one method of using the GUI 121, a drop-down selection (not shown) is available for selecting data transmission mechanism using IP address or via email by the central laboratory analyst or field end user. Once the selection is made, the central laboratory analyst or field end user may enter an IP address or email address for data transmission. The end user may perform a background check and calibration check by actuating the background check button 127 and calibration check button 129 before data collection is initiated by the portable analytical apparatus 102. Once the background and calibration checks are completed, the end user may initiate data collection by entering a sample number or select a sample from pre-populated list at an entry location (not shown) and then initiate data collection by actuating the counter control button 133. The pre-populated list allows automatic link to the sample collection and field side sample analysis information and the automatic transmission of the information to the central laboratory controller with the rest of sample data information. Once gamma-ray counting of the sample is completed, the controller 108 automatically transmits the counting data to an off-site central laboratory instrument controller (not shown) if an Internet connection is established by the controller 108. In the instance when an Internet connection cannot be made or data transmission is interrupted, the end user can actuate a SEND button (not shown) on the controller 108 once the controller 108 has established an Internet connection to transmit the data to the central laboratory instrument controller. If data transmission is interrupted and data files are not sent to the central laboratory instrument controller, a popup message "Data transmission is not completed" will be displayed on the GUI 121. For the central laboratory analysts to determine if a sample is filled into the sample container 110 appropriately, the end user can simply place the sample on top of the shield assembly 104, focus the camera 135 on the sample and actuate the camera actuation button 131 and an image of the sample will be transmitted to the central laboratory with the data file of the sample. All the transmitted data file associated with a sample will be processed and analyzed by qualified central laboratory analysts.

In some embodiments, the portable analytical apparatus 102 can be powered with a light pack of battery, e.g. laptop computer battery or can be powered by connecting the apparatus to a wall receptacle.

As shown in FIG. 6, in some embodiments a removable protection piece 119 may be disposed within the chamber 120 of the shield assembly 104 for protection of the detector 111 and other parts of the detector arrangement 105 from sample spills and other contaminations.

Figure 3:
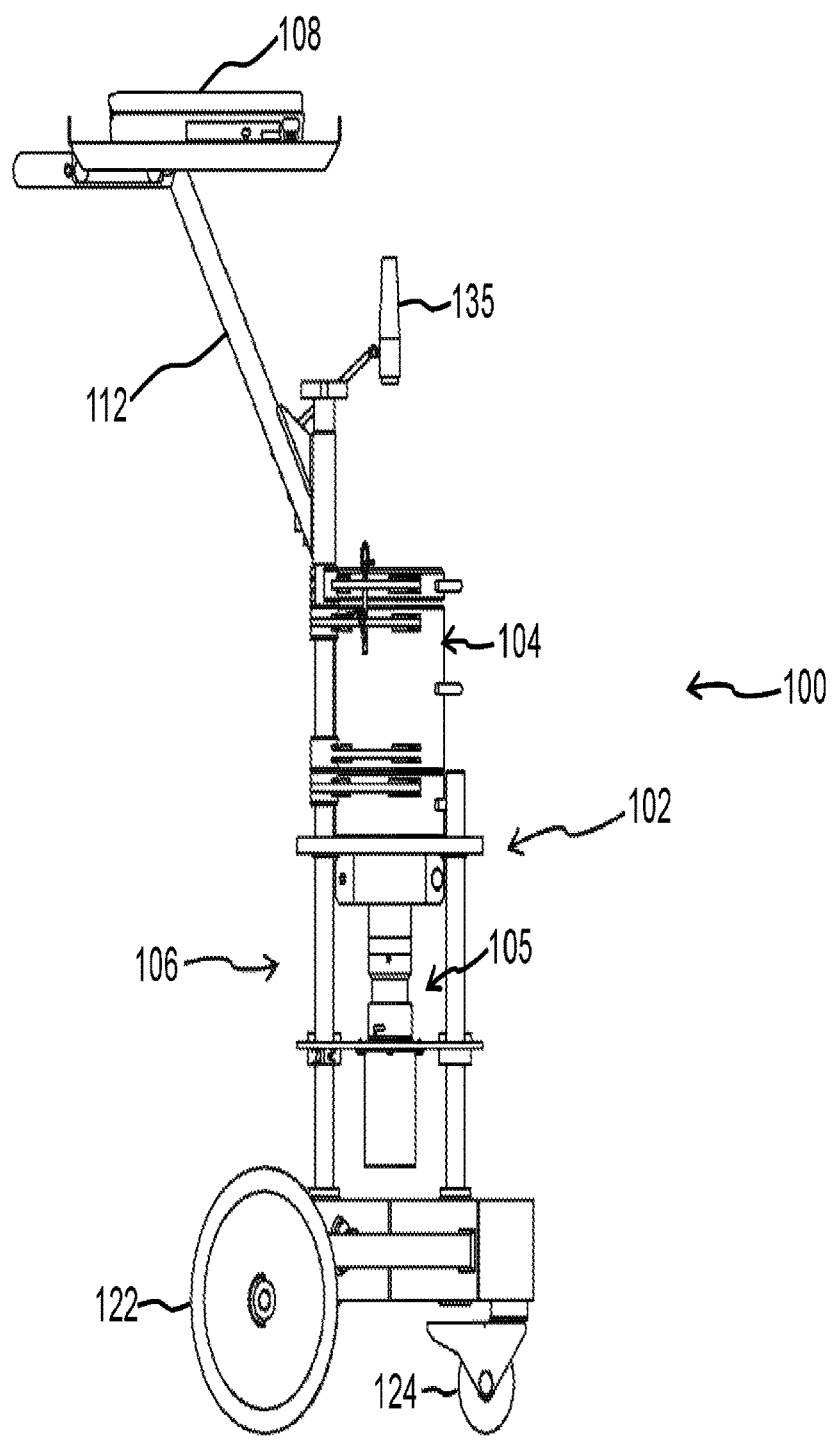
FIG. 3 is a side view of the portable analytical apparatus.
Figure 4:
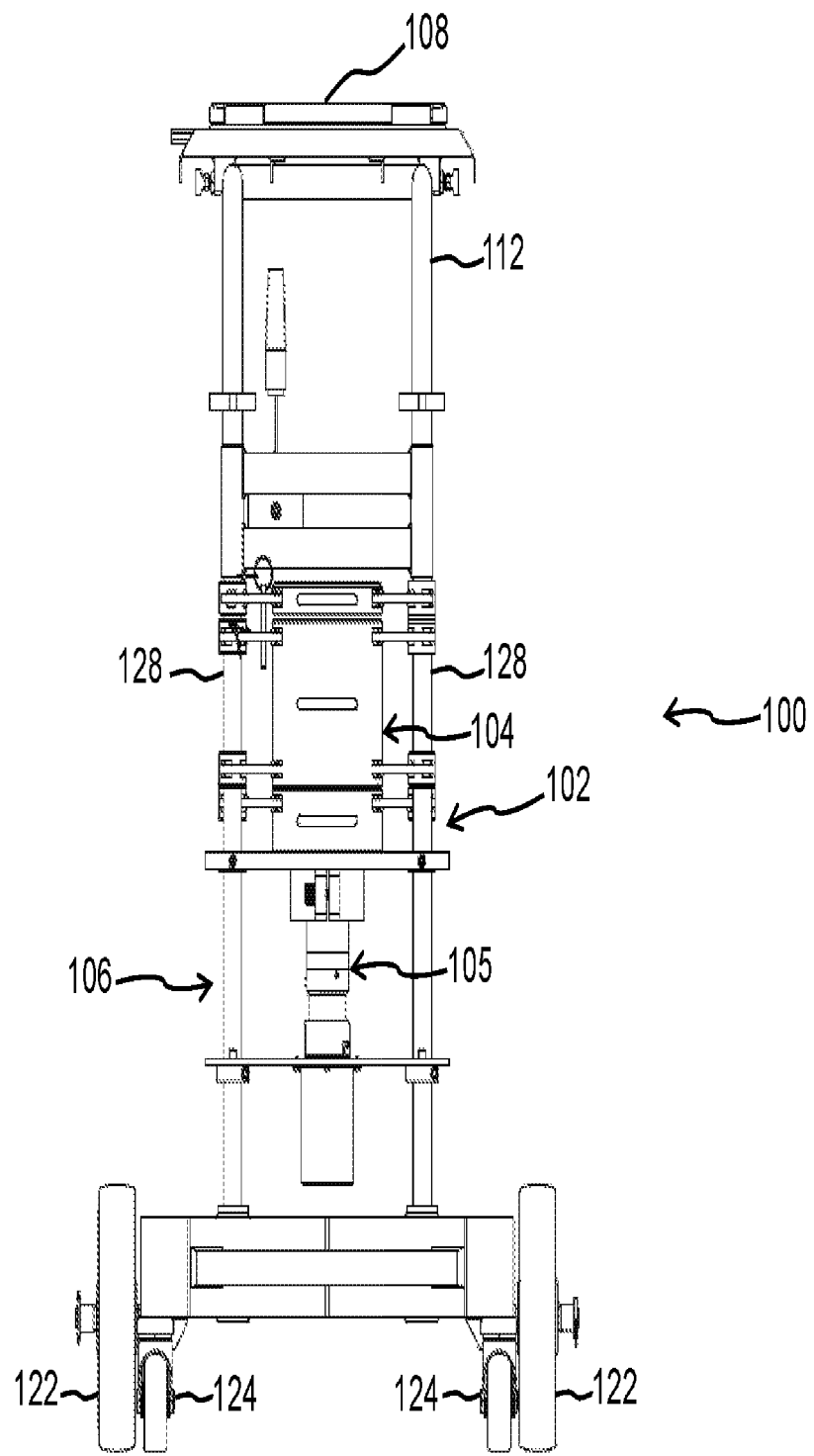
FIG. 4 is a rear view of the portable analytical apparatus.

As shown in FIGS. 1 and 3, in some embodiments a camera 116 may be attached to the modular frame 106 and may be used for field users to take photos of the sample which fills the sample container 110 and the photos being transmitted to a central laboratory location for central laboratory analysts to determine if a sample is filled appropriately. In some embodiments, a GPS component (not shown) may be integrated into the portable analytical apparatus 102 to provide geographical location data for central laboratory analysts to track where the sample data is collected. In some embodiments, a standalone balance or a balance integrated with the portable analytical apparatus 102 may be provided for sample density determinations. The obtained sample density information can be used for correcting sample matrix density effect on radio-activity concentrations of the detected corresponding radioisotopes.

The portable analytical apparatus 102 is designed and made for quick assembly and disassembling of the modular shield assembly 104, detection assembly 105, and modular frame 106, e.g. in less than 20 minutes. In addition, the modular frame 106 can be disassembled and placed modularly and securely on a fixture (not shown) that fits within a compact car trunk space or in a shipping container (not shown) for transportation and field applications.

In some embodiments, the sample container 110 may be made of made of plastic or other suitable material that allows for the detection of any gamma rays emitted by the sample. In some embodiments, the removable protection piece 119 may also be made of plastic or other suitable material that allows for the detection of any gamma rays emitted by the sample.

Figure 9:
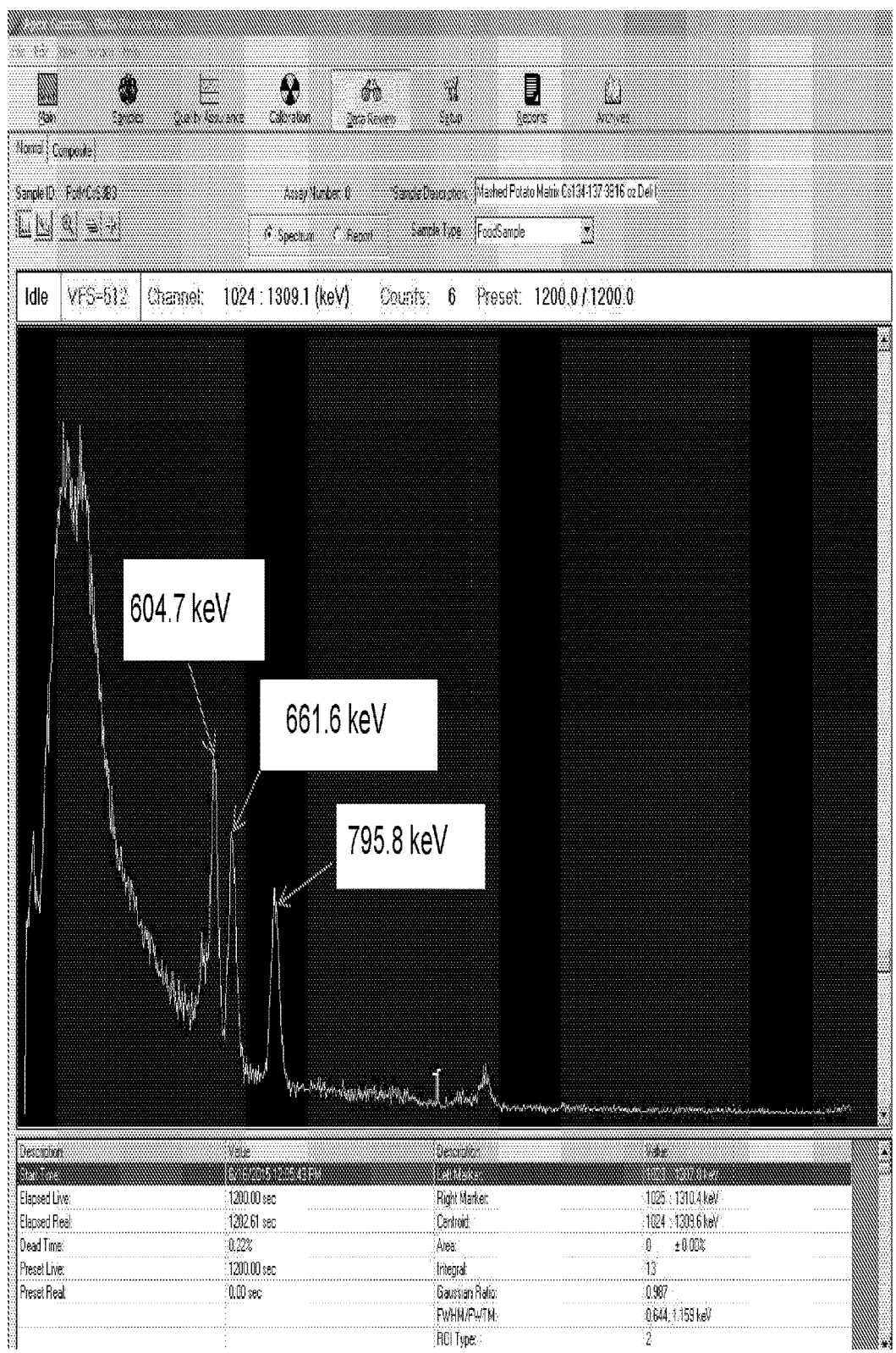
FIG. 9 is a spectrum collected from a sample spiked with Cs-134 and Cs-137 using the portable gamma-ray analysis system.

The gamma-ray analysis system 100 has a gamma-ray identification capability that is dependent on the type of detector 111 being used and any available gamma-ray detector is applicable depending on data quality objectives. For example, the gamma-ray analysis system 100 may be a high purity Germanium (Ge) spectrometry system for identifying specific radioisotopes. In one embodiment, the detector 111 may be a Cerium Bromide (CeBr3) detector. Referring to FIG. 9, an example of Cs-134 and Cs137 spectral lines is shown in a gamma-ray spectrum detected by the portable analytical apparatus 102. The corresponding radioactivity concentrations of Cs-134 and Cs-137 can be obtained from analysis of the spectrum and the data were shown in FIG. 10. The data indicate that the Cs-134 was detected by the portable analytical apparatus 102 at 582 Bq/kg (spiked level was at 593 Bq/kg) and Cs-137 was detected at 583 Bq/kg (spiked level was at 618 Bq/kg) based on the analysis of the spectrum.

The embodiments of the portable gamma-ray analysis system 100 described herein in the context of gamma-ray detection are merely a specific example, and are neither meant to limit to the described sample geometry, shield configuration nor to the applicability of such systems and methods to gamma-ray detection. For instance, with the mathematical modeling software and limited number of standards, the analysis system allows detection and quantification of gamma-ray emitting radionuclides and converting the detected results to dose exposures. Also, the embodiments and functions of the portable gamma-ray analysis system 100 in the context of gamma-ray detection are not meant to limit to only the application of gamma-ray analysis. Those skilled in the art will understand that the functions implemented for removing knowledge and experience requirements of an end user and data transmission to a central laboratory can also be used in other analytical areas such as micro biology, chemistry etc. in which real time in-situ detection or analysis of an unknown at a location where (a) expertise in analyzing and interpreting analytical data is not available and the data need to be transmitted to a qualified central analytical laboratory that has the needed expertise for real time data analysis and laboratory conclusion of the analysis; and (b) at a field location, operating the field side of the apparatus does not require any prior knowledge or experience in the subject of analytical applications from the operator.

The Minimum Detectable Activity Concentrations (MDCs), Level of Quantifications (LOQs), trueness and precision data were obtained using 20 minute gamma-ray counting with variety of sample matrices. Twenty seven water blanks, fifty food matrix blanks with 19 different matrices, and fifty nine spiked food samples with 15 different matrices were used for evaluating the MDCs and LOQs respectively. Table I shows a summary of average MDC and LOQ values for Cs-134 at 795 keV, Cs-137 at 661 keV, and I-131 at 364 keV obtained from the measurement of above samples.

TABLE I

Summary of Average MDC and LOQ

|  | Cs-134 | | Cs-137 | | I-131 | |
| --- | --- | --- | --- | --- | --- | --- |
|  | 795 keV MDC (Bq/kg) | 795 keV LOQ (Bq/kg) | 661 keV MDC (Bq/kg) | 661 keV LOQ (Bq/kg) | 364.5 keV MDC (Bq/kg) | 364.5 keV LOQ (Bq/kg) |
| Average of Water Measurements | 36.32 | 164.06 | 33.66 | 156.85 | 35.20 | 160.97 |
| Avg Low Densities (0.3-0.7 g/cc) | 47.44 | 194.86 | 45.45 | 189.24 | 45.41 | 189.08 |
| Avg Medium Denisties (0.7-1.1 g/cc) | 33.81 | 157.18 | 31.17 | 150.18 | 32.40 | 153.40 |
| Avg High Densities (1.1-1.6 g/cc) | 24.85 | 133.85 | 23.97 | 131.75 | 24.59 | 133.21 |
| Average of All Matrices | 35.73 | 162.78 | 33.60 | 157.05 | 34.51 | 159.43 |

The method accuracy was determined by assaying standards containing non-volatile radionuclides of interest. Cs-134 and Cs-137 were evaluated in spiked food matrices of varying densities to validate the ability of the spectrometers to identify and quantify both radio-activities. Table II gives a summary of trueness and precision for Cs-134 and Cs-137 at the same corresponding energies obtained from samples spiked at the levels around MDC, LOQ and the FDA Recommended Intervention Levels (DILs) for Cs-134 and Cs-137. Due to the short half-life (8 days) and volatility of I-131 (364.5 keV), it was evaluated using the surrogate 356 keV line of Ba-133 in the Laboratory Control Sample (LCS). The LCS is an epoxy with a density of 1.05 g/mL spiked with approximately 500 Bq of Ba-133, Cs-137, and Co-60 respectively. The measured values were within 2 sigma of the known value. The precision for Ba-133 has an average of 15.25% and a bias of −9.68%. Ba-133 is used for evaluating the MDC and LOQ for I-131 for spiked samples.

TABLE II

Summary of Trueness and Precision

|  | Density (g/cc) | Radio-nuclide | Energy Line (keV) | % Precision *2 | % Bias *3 |
| --- | --- | --- | --- | --- | --- |
| Low Denisty Range (0.4-0.7 g/cc) | 0.5225 | Cs-134 | 795 | 16.97% | −8.54% |
|  |  | Cs-137 | 661 | 16.53% | −15.14% |
| Medium Density Range (0.7-1.1 g/cc) | 1.01 | Cs-134 | 795 | 18.07% | 2.81% |
|  |  | Cs-137 | 661 | 17.98% | −4.33% |
| High Density Range (1.1-1.4 g/cc) | 1.22 | Cs-134 | 795 | 15.89% | −12.16% |
|  |  | Cs-137 | 661 | 15.95% | −20.21% |
| Average of All Foods Range (0.4-1.4 g/cc) | 0.964 | Cs-134 | 795 | 17.30% | −4.02% |
|  |  | Cs-137 | 661 | 17.13% | −11.35% |

*2 % Precision = Standard Deviation divided by the Measurement Value
*3 % Bias = Difference Between Reference Value and the Measurement Value divided by the Reference Value It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A portable analytical apparatus comprising:
   a central laboratory controller; and
   a portable field unit in operative communication with the central laboratory controller, the portable field unit comprising:
   a modular frame that is scalable;
   a modular shield assembly that is scalable and coupled to the modular frame, the modular shield assembly defining a chamber for receiving a sample container having a sample therein and being made of a material that shields the chamber from any emissions from the outside environment;
   a detector arrangement coupled to the modular frame and the modular shield assembly, the detector arrangement including a detector in communication with the sample container disposed within the chamber of the modular shield assembly for detecting radioactive emissions from the sample contained therein; and
   a controller for receiving data from the detector arrangement related to gamma-ray emissions emitted from the sample;
   wherein the modular shield assembly comprises a detector receiving portion that defines a central bore configured to receive a portion of the detector arrangement.

2. The portable analytical apparatus of claim 1, wherein the modular shield assembly further comprises one or more middle portions collectively defining the chamber.

3. The portable analytical apparatus of claim 1, wherein the modular shield assembly comprises a rotatable cover in communication with the chamber for opening and closing access to the chamber by the rotatable cover.

4. The portable analytical apparatus of claim 1, wherein the modular frame comprises a base with at least one pair of wheels.

5. The portable analytical apparatus of claim 1, wherein the modular frame comprises a controller stand assembly including a platform configured to serve as a base for the controller.

6. The portable analytical apparatus of claim 1, further comprising an electronic interface component for processing the data from the detector arrangement related to any radioactive emissions emitted from the sample and converting the data from an analog format to a digital format.

7. The portable analytical apparatus of claim 1, further comprising a removable protective piece configured to be disposed within the chamber and at least partially encase the sample container.

8. The portable analytical apparatus of claim 1, further comprising a removable protection piece defining an interior chamber configured to receive therein the sample container, wherein the sample container is configured to be received within the chamber of the shield assembly.

9. The portable analytical apparatus of claim 1, wherein the shield assembly is made from a material that shields the sample from background gamma-ray emissions from the outside environment.

10. The portable analytical apparatus of claim 1, wherein the controller runs a software application that transmits the data in digital format to a remote central location for further processing and analysis.

11. The portable analytical apparatus of claim 10, further comprising:
a camera in operative communication with the controller for taking a picture of the sample before or after testing of the sample; and
a global positioning system (GPS) in operative communication with the controller for transmitting the location of the field unit to a central laboratory.

12. The portable analytical apparatus of claim 1, wherein the modular shield assembly comprises a stainless steel material.

13. The portable analytical apparatus of claim 1, further comprising:
a mathematical modeling package in operative communication with the controller for converting detected radioactivity concentration comprising Bq/kg to dose exposure.

14. The portable analytical apparatus of claim 1, wherein the portable field unit is disassembleable into components each weighing 20 pounds or less for transportation, and the components are readily assemblable in a desired field location without requiring tools.

15. A portable analytical apparatus comprising:
a modular frame that is scalable;
a modular shield assembly that is scalable for accommodating different geometries and sizes of samples and coupled to the modular frame, the modular shield assembly comprising a middle portion defining a chamber for receiving a sample container having a sample therein, a top portion including a rotatable cover in communication with the chamber of the middle portion for opening and closing access to the chamber by the rotatable cover, and a bottom portion defining a central bore in communication with the chamber of the middle portion;
a detector arrangement coupled to the modular frame and received within the central bore of the bottom portion for the modular shield assembly, the detector arrangement including a detector in communication with the sample container disposed within the chamber of the modular shield assembly for detecting any radioactive emissions from the sample contained therein; and a controller for receiving data from the detector arrangement related to any radioactive emissions emitted from the sample.

16. The portable analytical apparatus of claim 15, wherein the shielding assembly is made of a material that shields the chamber from any emissions from the outside environment.

17. The portable analytical apparatus of claim 15, further comprising a balance for providing density determinations of the sample.

18. The portable analytical apparatus of claim 15, further comprising a modular assembly that allows the detector to point to different directions when analysis is needed for subjects outside of the shield assembly with different geometries.

19. A method for detecting gamma-ray radiation in a sample in situ comprising:
providing a portable analytical apparatus comprising:
a modular frame;
a modular shield assembly coupled to the modular frame, the modular shield assembly defining a chamber for receiving a sample container having a sample therein and being made of a material that shields the chamber from any emissions from the outside environment;
a detector arrangement coupled to the modular frame and the modular shield assembly, the detector arrangement including a detector in communication with the sample container disposed within the chamber of the modular shield assembly for detecting any gamma-ray emissions from the sample contained therein; and
a controller for receiving data from the detector arrangement related to any radioactive emissions emitted from the sample;
conducting a background check for the presence of background radiation interference proximate the portable analytical apparatus;
conducting a calibration check of the portable analytical apparatus;
disposing a sample within the sample container and inserting the sample container within the modular shielding assembly for the detection of radioactive emissions from the sample by the detector arrangement; and
transmitting the data related to the detection of the radioactive emissions to a central laboratory for analysis.

20. The method of claim 19, further comprising inserting the sample container into a sample container handler prior to insertion into the shielding assembly.

21. The method of claim 19, further comprising an electronic interface component and graphic user interface (GUI) for processing the data from the detector arrangement related to any radioactive emissions emitted from the sample and converting the data from an analog format to a digital format prior to transmitting the data to the off-site laboratory.

22. A portable analytical apparatus comprising:
a central laboratory controller; and
a portable field unit in operative communication with the central laboratory controller, the portable field unit comprising:
a modular frame that is scalable;
a modular shield assembly that is scalable and coupled to the modular frame, the modular shield assembly defining a chamber for receiving a sample container having a sample therein and being made of a material that shields the chamber from any emissions from the outside environment;
a detector arrangement coupled to the modular frame and the modular shield assembly, the detector arrangement including a detector in communication with the sample container disposed within the chamber of the modular shield assembly for detecting radioactive emissions from the sample contained therein; and
a controller for receiving data from the detector arrangement related to gamma-ray emissions emitted from the sample;
wherein the controller runs a software application that transmits the received data in digital format to a remote central location for further processing and analysis; and
the portable analytical apparatus further comprising:
a camera in operative communication with the controller for taking a picture of the sample before or after testing of the sample; and a global positioning system (GPS) in operative communication with the controller for transmitting the location of the field unit to a central laboratory.

* * * * *